United States Patent
Fejfar

(10) Patent No.: US 7,750,920 B2
(45) Date of Patent: Jul. 6, 2010

(54) METHOD AND APPARATUS FOR GENERATING A COLOR REFERENCE FOR A PRINT IMAGE

(75) Inventor: Florian Fejfar, Munich (DE)

(73) Assignee: Man Roland Druckmaschinen AG, Augsburg (DE)

( * ) Notice: Subject to any disclaimer, the term of this patent is extended or adjusted under 35 U.S.C. 154(b) by 526 days.

(21) Appl. No.: 11/778,508

(22) Filed: Jul. 16, 2007

(65) Prior Publication Data
US 2008/0012876 A1 Jan. 17, 2008

(30) Foreign Application Priority Data
Jul. 17, 2006 (DE) .................. 10 2006 033 006

(51) Int. Cl.
G09G 5/00 (2006.01)
G09G 5/02 (2006.01)
H04N 1/60 (2006.01)
G03F 3/10 (2006.01)
G06K 9/40 (2006.01)
G06K 9/00 (2006.01)
G06F 3/12 (2006.01)
G06F 15/00 (2006.01)

(52) U.S. Cl. .................. 345/589; 345/581; 345/428; 345/600; 345/606; 348/441; 348/445; 348/556; 348/647; 358/1.1; 358/1.9; 358/518; 358/501; 382/162; 382/167; 382/254; 382/274

(58) Field of Classification Search .................. 345/418, 345/428, 581, 589–591, 600–601, 606, 618, 345/442, 549; 347/1, 100; 348/441, 445, 348/469, 496, 556–558, 578, 647, 671–674; 358/1.1–1.2, 1.9, 501, 502, 518, 525, 447; 382/162–169
See application file for complete search history.

(56) References Cited

U.S. PATENT DOCUMENTS

| 4,769,696 A | 9/1988 | Utsuda et al. |
| 4,926,254 A | 5/1990 | Nakatsuka et al. |
| 5,696,889 A | 12/1997 | Morikawa |
| 5,781,709 A | 7/1998 | Usami et al. |
| 6,252,676 B1 | 6/2001 | Azima et al. |

(Continued)

FOREIGN PATENT DOCUMENTS

DE 30 49 349 A1 9/1981

(Continued)

Primary Examiner—Wesner Sajous
(74) Attorney, Agent, or Firm—Crowell & Moring, LLP

(57) ABSTRACT

A method and apparatus for generating a color reference for an image to be printed for visualizing the same on a true-color monitor is disclosed. Lower-resolution image data are generated from high-resolution raster data for the image to be printed which are obtained from page description data for the image to be printed. The lower-resolution data are converted into display data which serve as color reference for the image to be printed and which can be visualized on a true-color monitor. An actual transmission characteristic is ascertained. The actual transmission characteristic ascertained is compared with a specified (desired) transmission characteristic, where, on the basis of this comparison, a correction curve is calculated which is required to arrive at the desired transmission characteristic starting with the actual transmission characteristic. The display data are ascertained using the calculated correction curve.

20 Claims, 1 Drawing Sheet

U.S. PATENT DOCUMENTS

| | | |
|---|---|---|
| 6,324,975 B1 | 12/2001 | Kondo |
| 6,798,536 B1 | 9/2004 | Muramoto |
| 2002/0008880 A1 | 1/2002 | Dewitte et al. |
| 2002/0167497 A1* | 11/2002 | Hoekstra et al. ............ 345/179 |
| 2003/0107609 A1* | 6/2003 | Shiraishi ........................ 347/6 |
| 2003/0123072 A1 | 7/2003 | Spronk |
| 2003/0137556 A1* | 7/2003 | Nunokawa ................... 347/43 |
| 2006/0007256 A1 | 1/2006 | Tanaka et al. |
| 2007/0058859 A1* | 3/2007 | Baker et al. ................. 382/167 |
| 2007/0085910 A1* | 4/2007 | Anderle et al. ........... 348/223.1 |
| 2009/0086235 A1* | 4/2009 | Yamamoto et al. ........... 358/1.9 |
| 2009/0185208 A1* | 7/2009 | Yoshizawa et al. ........... 358/1.9 |

FOREIGN PATENT DOCUMENTS

| | | |
|---|---|---|
| DE | 32 33 427 A1 | 3/1983 |
| DE | 33 47 049 A1 | 7/1985 |
| DE | 103 05 046 A1 | 8/2004 |
| EP | 0 402 079 A2 | 12/1990 |
| EP | 0 538 901 B1 | 4/1993 |
| EP | 1 388 418 A1 | 2/2004 |

* cited by examiner

METHOD AND APPARATUS FOR GENERATING A COLOR REFERENCE FOR A PRINT IMAGE

This application claims the priority of German Patent Document No. 10 2006 033 006.4, filed Jul. 17, 2006, the disclosure of which is expressly incorporated by reference herein.

BACKGROUND AND SUMMARY OF THE INVENTION

The invention relates to a method and an apparatus for generating a color reference for a print image to be printed for visualizing the reference on a true-color monitor.

In accordance with normal practice, a reference sample produced on a colored ink jet printer serves as a color reference when running a print job on a press, as for example on a web rotary press or on a sheet-fed press, where a printer compares the copies printed on the press with this reference sample. Such reference samples printed on a colored ink jet printer are referred to as a hard proof. It is further known from practice to visualize in addition to, or as a substitute for, the hard proof produced on the colored ink jet printer a color reference on a true-color monitor. The visualization of a color reference on a true color monitor is referred to as a soft proof. The present invention relates to a method for generating a color reference for an image to be printed for visualizing the reference as a soft proof on a true-color monitor.

The procedure in practice when generating a color reference for an image to be printed for visualizing the reference as a soft proof is that lower-resolution image data are generated from high-resolution raster data which are obtained for a print form exposure from page description data with the aid of a raster image processor, where the lower-resolution image data are converted into display data with the aid of a color management device which serve as color reference for the image to be printed and can be displayed as a soft proof on a true-color monitor. In practice, high-resolution raster data are accordingly first reduced in resolution and converted into image data, where the display data serving as the color reference are obtained from the image data.

The adoption, or use, of the raster data generated in the raster image processor for generating the color reference for an image to be printed is problematic insofar as the generation of the raster data from the page description data in the raster image processor takes place while using RIP correction functions to compensate for non-linear transmission characteristics of tone values or full-coverage values in the exposure of print forms. The RIP correction functions are not consistent but rather are subject to modifications or adaptations in order to take into account the changing composition of a print form or a changing exposure process for the print form. Consequently, based on such changing RIP correction functions, page description data existing for example as tone values can be reproduced or imaged differently in the raster data to be generated from them, for example as full-coverage values. Since, however, the raster data are the basis for generating the display data serving as the color reference for a soft proof visualization, the changing RIP correction functions can affect the display data such that the data are degraded in their quality with respect to the soft proof to be visualized. Until now no methods for generating a color reference for an image to be printed for soft proof visualization of the reference are known which take the above problem into account.

Starting with this, the problem underlying the present invention is to create a method and a device for generating a color reference for an image to be printed which improves the color reproduction of the image to be printed.

This problem is solved by the invention in accordance with FIG. 1. In accordance with an embodiment of the invention, the method comprises at least the following steps: a) an actual transmission characteristic is ascertained which is used in the raster image processor to generate corresponding raster data from the page description data of the image to be printed; b) the actual characteristic is compared with a specified reference transmission characteristic; on the basis of this comparison, a correction curve is calculated which is required to arrive at the specified reference transmission characteristic starting from the actual transmission characteristic; and c) the display data are determined using the calculated correction curve.

Using the method in accordance with the invention, it is provided for the first time to determine an actual transmission characteristic which is used in the raster image processor to generate the raster data from the page description data, and on the basis of a comparison between the actual transmission characteristic ascertained and a specified reference transmission characteristic to generate a correction curve, using which the display data serving as color reference are established. The actual transmission characteristic ascertained is dependent on the RIP correction function in the raster image processor so that, with the aid of the calculated correction curve, data changes detracting from the quality of the soft proof visualization in the display data are compensated for or discounted. The quality of a soft proof visualization can thereby be improved.

In accordance with an advantageous further development, the actual transmission characteristic is determined by evaluating a defined area of the raster data or the image such that full-coverage values or tone values are ascertained for this defined area of the raster data or the image data, where these full-coverage values or tone values ascertained for the defined area are compared with full-coverage values or tone values which result with known page description data for the defined image area and with a linear transmission characteristic when converting the page description data into linear raster data or linear image data and where the actual transmission characteristic is calculated on the basis of this comparison.

In the case of the defined area, it is preferably a control element configured as a constituent part of the image to be printed, which has at least one field with a specified full-coverage value or tone value and at least one field to identify the control element in the raster data or image data.

The apparatus in accordance with an embodiment of the invention comprises: a) a device which automatically determines an actual transmission characteristic which is used in the raster image processor to generate the raster data automatically from the page description data for the image to be printed; b) a device which automatically compares the actual transmission characteristic with a specified reference transmission characteristic, and on the basis of this comparison, a correction curve is automatically calculated which is required to arrive at the reference transmission characteristic starting from the actual transmission characteristic; and c) a device which automatically determines the display data using the calculated correction curve.

Preferred further developments of the invention can be found in the description following. Embodiments of the invention are explained in greater detail using the drawing, without being restricted thereto.

DETAILED DESCRIPTION OF THE DRAWING

Figure 1:
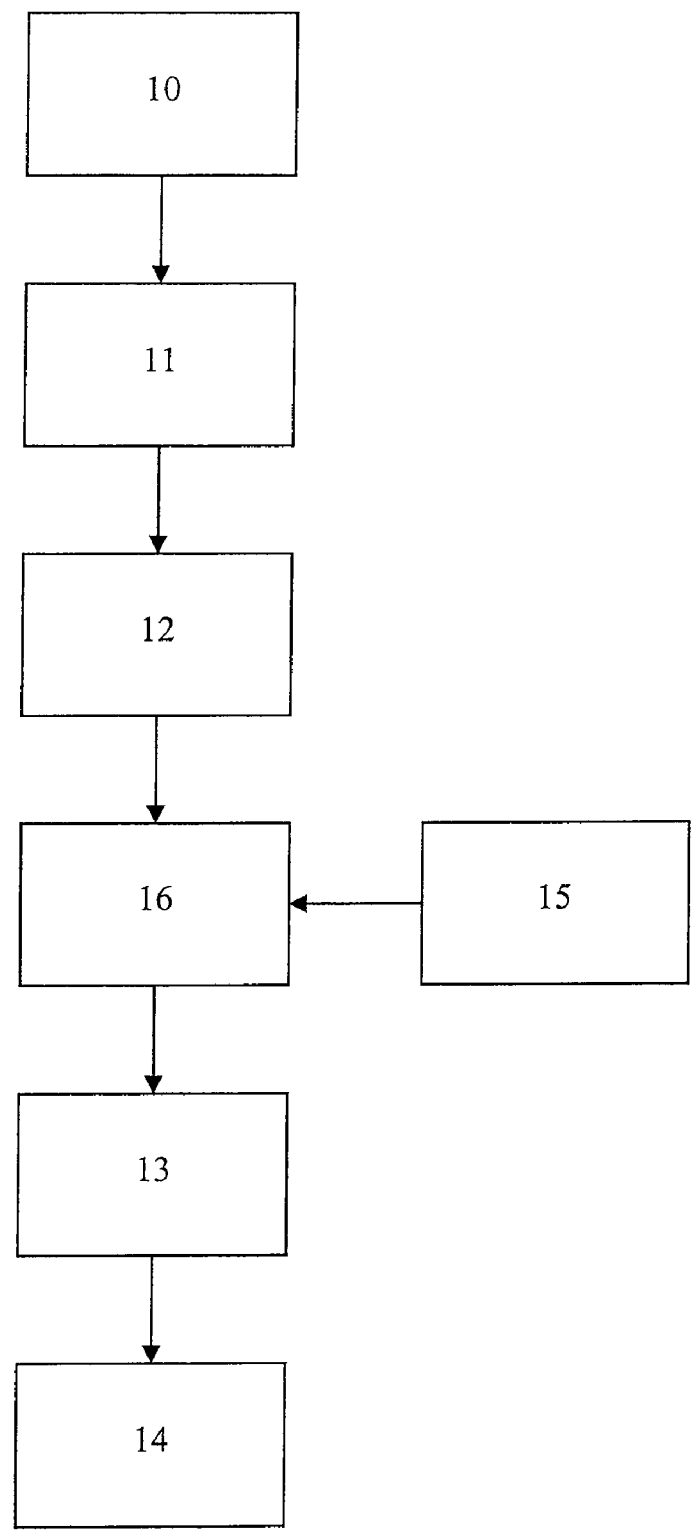
FIG. 1 shows a schematized block diagram in accordance with the invention for generating a color reference for an image to be printed.

In what follows, an embodiment of the invention for generating a color reference for an image to be printed for soft proof visualization of the image on a true-color monitor will be described in detail with reference to FIG. 1.

In broad strokes, the procedure for generating the color reference for an image to be printed is that high-resolution raster data are obtained with the aid of a raster imaging processor—abbreviated RIP—which are visualized by block 11, from page description data for the image to be printed, visualized by block 10. High-resolution raster data of this kind are used to expose print forms, specifically printing plates, and are obtained from the page description data of the image to be printed using RIP correction functions which are implemented in the raster image processor.

The page description data are available as Postscript data or PDF data and preferably define the image to be printed by means of tone values. The image to be printed is preferably defined in the raster data by means of full-coverage values.

From the raster data visualized by block 11, lower-resolution image data are generated which are preferably available as a byte map. The lower-resolution image data are visualized by block 12.

The image data are converted with the aid of a color management device into display data which serve as color reference for the image to be printed and are shown in FIG. 1 by block 13. The display data can be visualized on a true-color monitor in the form of a soft proof, where the soft proof to be visualized is represented by block 14.

The process steps of the inventive method for generating a color reference for an image to be printed for soft proof visualization illustrated by blocks 10 to 14 are already used in the methods known from practice so that the process steps are known to the person skilled in the art addressed here and require no detailed description. They include the generation of high-resolution raster data from page description data with the aid of a raster image processor, the generation of lower-resolution image data from the high-resolution raster data, the conversion of the image data into display data with the aid of a color management device and the visualization of the display data on a true-color monitor. From this it follows that according to the prior art, a soft proof to be visualized is dependent on the raster data and thus on an RIP correction function which is used in the raster image processor for generating the raster data from the page description data.

In order to design soft proof visualization to improve the quality of the visualization independently of the RIP correction functions implemented in the raster image processor, it is provided in the sense of the present invention to ascertain an actual transmission characteristic automatically which is used in the raster image processor to generate the corresponding raster data automatically from the page description data of the image to be printed.

This actual transmission characteristic is automatically compared with a specified reference transmission characteristic, where, on the basis of this comparison, a correction curve is automatically calculated which is required to arrive at the specified reference transmission characteristic starting from the actual transmission characteristic. The display data which serve as the color reference for the image to be printed are automatically ascertained in accordance with the invention using the calculated correction curve. The correction curve ascertained is visualized in FIG. 1 by block 15.

In the embodiment visualized in FIG. 1, the correction curve ascertained and visualized by block 15, is applied to the image data visualized by block 12, which are lower-resolution and dependent on the RIP correction function of the raster image processor and thus uncorrected, where the uncorrected image data are converted into corrected image data on the basis of the correction curve. The corrected image data generated on the basis of the correction curve are visualized in FIG. 1 by block 16. From these corrected image data in which the effect of RIP correction functions is discounted by way of the correction curve, the display data are then generated which serve as color reference for the image to be printed and thus for soft proof visualization.

It should be pointed out that the application of the correction curve visualized by block 15 to the uncorrected image data visualized by block 12 is preferably carried out in the form of a gradation correction to the uncorrected image data which are preferably available as a byte map.

Unlike the embodiment shown, the correction curve visualized by block 15 can also be applied to the high-resolution raster data visualized by block 11, where lower-resolution image data which are independent of RIP correction functions in the raster image processor are generated from correspondingly corrected raster data. The image data generated in this way can then be converted into display data which in turn act as color reference for the image to be printed.

It is also possible to use the correction curve in the color management device, visualized by block 15, in order to ascertain display data from the uncorrected image data which are dependent on RIP correction functions by using the correction curve, in which display data the RIP correction functions are discounted and which then act as color reference for the image to be printed.

When ascertaining the actual transmission characteristic which is used in the raster image processor to generate the raster data from the page description data for the image to be printed, the preferable procedure is that a defined area of the raster data visualized by block 11, or of the image data visualized by block 12, which are dependent on RIP corrections, is analyzed. This defined area of the raster data or of the image data is preferably formed by a control element which is a constituent part of the image to be printed.

Such a control element has at least one field with a specified full-coverage value or tone value and at least one field for identifying the control element in the raster data or tone data. The control element preferably comprises several fields with specified full-coverage values or tone values which form a defined tone value progression or full-coverage value progression for the control element.

If the area of the raster data or image data corresponding to the control element is found in the data, full-coverage values or tone values are ascertained for this defined area, where these full-coverage values or tone values ascertained for the defined area are compared with full-coverage values or tone values which result with known page description data for the defined area, or for the control element, assuming a linear transmission characteristic when converting the page description data into linear raster data or image data. On the basis of this comparison, the actual transmission characteristic can be calculated such that for each field of the control element which is identified by a specified full-coverage value or tone value a node on the actual transmission characteristic is defined and an interpolation is performed between adjacent nodes to complete the actual transmission characteristic. The actual transmission characteristic ascertained in this way thus represents an RIP correction function implemented in the raster image processor or reconstructs the same.

To ascertain the correction curve visualized by block 15, the actual transmission characteristic is compared with a specified reference characteristic, where, in the case of the specified reference transmission characteristic, it may involve a linear or also a non-linear reference transmission characteristic. On the basis of this comparison between the actual transmission characteristic ascertained and the specified reference transmission characteristic, the correction curve is calculated which is required to arrive at the reference transmission characteristic starting from the actual transmission characteristic.

Unlike the preferred embodiment described above, it is also possible to ascertain the actual transmission characteristic of the raster image processor, which preferably converts page description data available as tone values into raster data preferably available as full-coverage values, from metadata in the raster image processor. However, to do this it is necessary that corresponding metadata are held in readiness by the raster image processor and can be read out over an interface.

It is within the sense of the present invention to compensate by way of a correction curve for non-linearizations of the raster data made by a raster image processor by way of RIP corrections. This ensures that soft proof visualization is independent of RIP corrections in the raster image processor, whereby ultimately high-quality soft proof visualizations are possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims

What is claimed is:

1. A method for generating a color reference for an image to be printed for visualizing the reference on a true-color monitor, where lower-resolution image data are generated from high-resolution raster data for the image to be printed which are obtained with aid of a raster image processor from page description data for the image to be printed, wherein the lower-resolution image data are converted with aid of a color management device into display data which serve as color reference for the image to be printed and which are visualizable on the true-color monitor, the method comprising the steps of:
   a) an actual transmission characteristic is ascertained which is used in the raster image processor to generate corresponding raster data from the page description data for the image to be printed;
   b) the actual transmission characteristic ascertained is compared with a specified reference transmission characteristic, where, on a basis of this comparison, a correction curve is calculated which is required to arrive at a reference transmission characteristic starting from the actual transmission characteristic; and
   c) the display data are ascertained using the calculated correction curve.

2. The method according to claim 1, wherein in step a) the actual transmission characteristic is ascertained from metadata in the raster image processor.

3. The method according to claim 1, wherein in step a) the actual transmission characteristic is ascertained by analyzing a defined area of the raster data or the lower-resolution image data.

4. The method according to claim 3, wherein full-coverage values or tone values are ascertained for the defined area of the raster data or of the lower-resolution image data, where the full-coverage values or tone values for the defined area are compared with full-coverage values or tone values which result with known page description data for the defined area and with a linear transmission characteristic during a conversion of the page description data into linear raster data or linear lower-resolution image data and where, on a basis of this comparison, the actual transmission characteristic is ascertained.

5. The method according to claim 3, wherein the defined area of the raster data or the lower-resolution image data is formed by a control element which is a constituent part of the image to be printed, where the control element has at least one field with a specified full-coverage value or tone value and at least one field for identifying the control element in the raster data or the lower-resolution image data.

6. The method according to claim 1, wherein in step b) a linear reference transmission characteristic or a non-linear transmission characteristic is specified.

7. The method according to claim 1, wherein in step c) the correction curve is applied to the lower-resolution image data, where correspondingly corrected lower-resolution image data are converted into the display data serving as color reference for the image to be printed.

8. The method according to claim 1, wherein in step c) the correction curve is applied to the high-resolution raster data, where the lower-resolution image data are generated from correspondingly corrected raster data which are converted into display data serving as color reference for the image to be printed.

9. The method according to claim 1, wherein in step c) the correction curve in the color management device is applied to convert the lower-resolution image data into the display data serving as color reference for the image to be printed using the correction curve.

10. An apparatus for generating a color reference for an image to be printed for visualizing the reference on a true-color monitor, where, from high-resolution raster data for the image to be printed which are obtained from page description data for the image to be printed with aid of a raster image processor, the apparatus generates lower-resolution image data which are converted with the aid of a color management device into display data serving as color reference for the image to be printed and visualizable on a true-color monitor, comprising:
   a) a device which automatically ascertains an actual transmission characteristic which is used in the raster image processor to generate the high-resolution raster data from the page description data for the image to be printed;
   b) a device which automatically compares the actual transmission characteristic with a specified reference transmission characteristic and, on a basis of this comparison, automatically calculates a correction curve which is required to arrive at a reference transmission characteristic starting from the actual transmission characteristic; and
   c) a device which automatically ascertains the display data using the calculated correction curve.

11. The apparatus according to claim 10, wherein the device of element a) automatically ascertains the actual transmission characteristic from metadata in the raster image processor.

12. The apparatus according to claim 10, wherein the device of element a) automatically ascertains the actual transmission characteristic by analyzing a defined area of the high-resolution raster data or the lower-resolution image data.

13. The apparatus according to claim 12, wherein the device of element a) ascertains full-coverage values or tone values for the defined area of the high-resolution raster data or the lower-resolution image data, where the device compares these full-coverage values or tone values for the defined area with full-coverage values or tone values which result with known page description data for the defined area and with a linear transmission characteristic during a conversion of the page description data into linear raster data or linear lower-resolution image data and where the device calculates the actual transmission characteristic on a basis of this comparison.

14. The apparatus according to claim 10, wherein a linear reference transmission characteristic or a non-linear reference transmission characteristic is specified for the device of element b).

15. The apparatus according to claim 10, wherein the device of element c) applies the correction curve to the lower-resolution image data, where correspondingly corrected lower-resolution image data are converted into display data serving as color reference for the image to be printed.

16. The apparatus according to claim 10, wherein the device of element c) applies the correction curve to the high-resolution raster data, where the lower-resolution image data are generated from correspondingly corrected raster data which are converted into display data serving as color reference for the image to be printed.

17. The apparatus according to claim 10, wherein the color management device applies the correction curve to convert the lower-resolution image data into display data serving as color reference for the image to be printed using the correction curve.

18. A method for generating a color reference for an image to be printed on a color monitor, comprising the steps of:
   obtaining high-resolution raster data from page description data of the image;
   generating lower-resolution image data from the high-resolution raster data;
   converting the lower-resolution image data into display data, wherein the display data results after a correction has been applied to discount an effect of a raster imaging processor (RIP) correction function in the step of obtaining the high-resolution raster data from the page description data; and
   generating the color reference for the image on the color monitor by the display data.

19. The method according to claim 18, wherein the correction is applied to the lower-resolution image data.

20. The method according to claim 18, wherein the step of applying the correction includes the steps of:
   ascertaining an actual transmission characteristic in the step of obtaining the high-resolution raster data from the page description data; and
   comparing the actual transmission characteristic with a specified reference transmission characteristic to calculate a correction curve.

* * * * *